(12) United States Patent
Ito et al.

(10) Patent No.: US 7,593,628 B2
(45) Date of Patent: Sep. 22, 2009

(54) IMAGING APPARATUS WITH CAMERA SHAKE COMPENSATION

(75) Inventors: Yoshihiro Ito, Saitama (JP); Keiji Ohkubo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 383 days.

(21) Appl. No.: 11/348,255

(22) Filed: Feb. 7, 2006

(65) Prior Publication Data

US 2006/0177208 A1 Aug. 10, 2006

(30) Foreign Application Priority Data

Feb. 7, 2005 (JP) .............................. 2005-030186

(51) Int. Cl.
*G03B 17/00* (2006.01)
(52) U.S. Cl. ..................................... 396/55; 348/208.99
(58) Field of Classification Search ............. 396/52–55; 348/208.99–208.8, 262–265, 336–339, 208.11, 348/208.13
See application file for complete search history.

(56) References Cited

U.S. PATENT DOCUMENTS 5,023,723 A * 6/1991 Date et al. .................. 348/337

2003/0151685 A1 * 8/2003 Ia Grone ..................... 348/262
2005/0259156 A1 * 11/2005 Kosaka et al. ............ 348/208.7
2006/0056829 A1 * 3/2006 Hirota et al. .................. 396/54

FOREIGN PATENT DOCUMENTS

JP         5-14909 A      1/1993
JP         9-146137 A     6/1997

* cited by examiner

*Primary Examiner*—W B Perkey
*Assistant Examiner*—David M. Schindler
(74) *Attorney, Agent, or Firm*—Sughrue Mion, PLLC

(57) ABSTRACT

A lens unit is provided with two CCD image sensors and a color-separation prism for separating subject light into green light (G light), and a mixture of red light (R light) and blue light (B light). The color-separation prism allows the G light to enter into one of the CCD image sensors, and the mixture of the R and B light to enter into the other CCD image sensor. Sensor moving mechanisms drive the CCD image sensors individually in a plane perpendicular to an optical axis when camera shake is detected, thereby preventing the image from blurring.

5 Claims, 5 Drawing Sheets

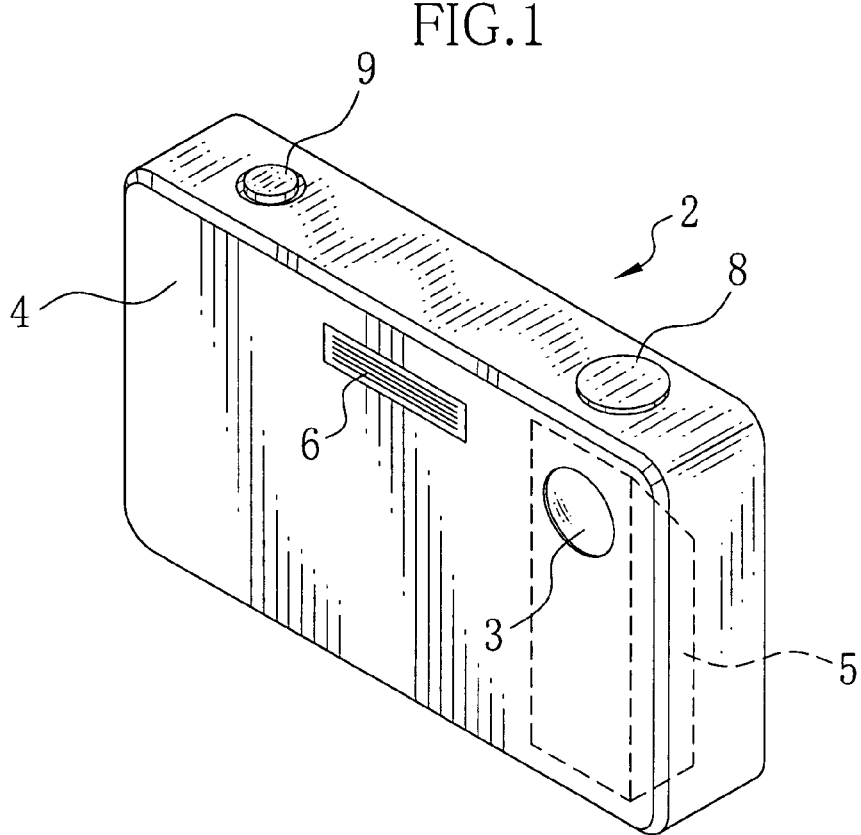
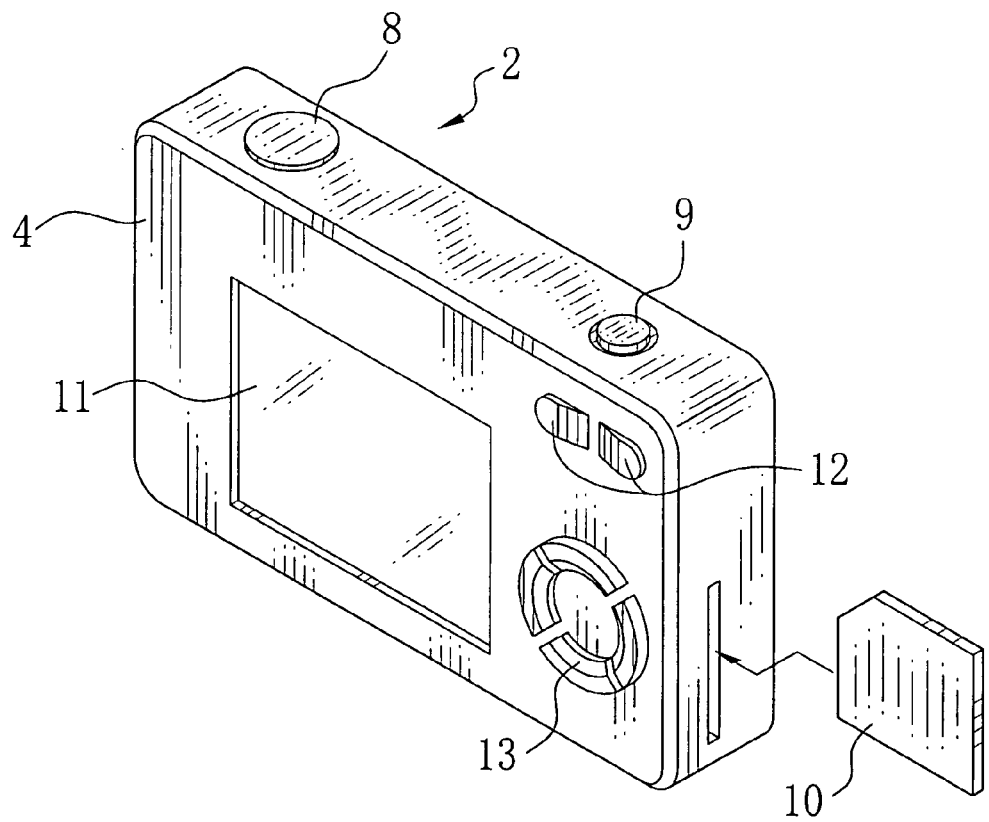

IMAGING APPARATUS WITH CAMERA SHAKE COMPENSATION

BACKGROUND OF THE INVENTION

1. Field of the Invention

The present invention relates to an imaging apparatus having plural image sensors.

2. Description of the Related Arts

Imaging apparatuses, such as a digital camera, are widely used. As one type of the digital camera, there is a multi-plate type digital camera, in which subject light is separated into its component colors and captured by two or three image sensors (see Japanese Patent Laid-Open Publications No. 5-14909). The multi-plate type digital camera can obtain images of relatively high resolution as compared to a single-plate type digital camera having one image sensor.

In addition, there has been known a digital camera, in which a camera shake at the time of capturing images is detected by a vibration sensor, and part of a taking lens is moved in a plane perpendicular to an optical axis thereof to compensate for the camera shake (see Japanese Patent Laid-Open Publications No. 9-146137). Since this digital camera is the single-plate type with one image sensor, the movement of the taking lens can correct a positional deviation of a subject image caused by the camera shake and the like so as to prevent blurring the image.

In the multi-plate type digital camera, however, a color-separation prism exists between the image sensor and a taking optical system. A direction to which the subject image is shifted by the camera shake is different between the subject light linearly transmitted through the color-separation prism and that transmitted through the color-separation prism after reflected on a color-separating surface thereof. In order to compensate for the camera shake by moving the lens, one solution is to provide a relay lens system for each image sensor, such that the subject light is once focused just before the color-separation prism and focused again after transmitting through the color-separation prism. The positional deviation of the subject image is corrected by moving each relay lens system. Such configuration invites substantial increase in the number of lens, the size of the optical system and manufacturing cost.

SUMMARY OF THE INVENTION

An object of the present invention is to provide an imaging apparatus capable of compensating for a camera shake in each of plural image sensors, without increasing the number of lens.

In order to achieve the above object and other objects, an imaging apparatus of the present invention includes plural image sensors, a color-separating optical system and plural sensor moving devices. The plural image sensors capture subject light, which has transmitted through a taking optical system. The color-separation optical system separates the subject light into its component colors each of which enters into the corresponding image sensor. Each of the plural sensor moving devices individually moves the corresponding image sensor in a plane perpendicular to an optical axis of the taking optical system.

According to a preferable embodiment of the present invention, the imaging apparatus includes a shake detector and a shake corrector. The shake detector detects direction and magnitude of a shake from outside. The shake corrector calculates a driving direction and driving amount of each of the plural sensor moving devices based on the detected direction and magnitude of the shake to correct a positional deviation of a subject image on an imaging surface of each of the plural image sensors. The shake corrector then drives each of the plural sensor moving devices according to the calculated driving direction and driving amount. Each of the plural sensor moving devices includes first and second actuators for moving the image sensor in two directions orthogonal to each other in the plane perpendicular to the optical axis.

According to the imaging apparatus of the present invention, the plural image sensors are individually moved in the plane perpendicular to the optical axis. Owing to this, it is possible to properly correct the positional deviation of the subject image after the color-separation by the color-separation optical system, even if it is shifted on each image sensor due to the camera shake. Therefore, it is unnecessary to provide a relay lens system between the color-separation optical system and the image sensor, and thus preventing increase in size of the optical system and manufacturing cost.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 1 is a front perspective view of a digital still camera to which the present invention is applied;

FIG. 2 is a rear perspective view of the digital still camera;

DETAILED DESCRIPTION OF THE PREFERRED EMBODIMENTS

Figure 3:
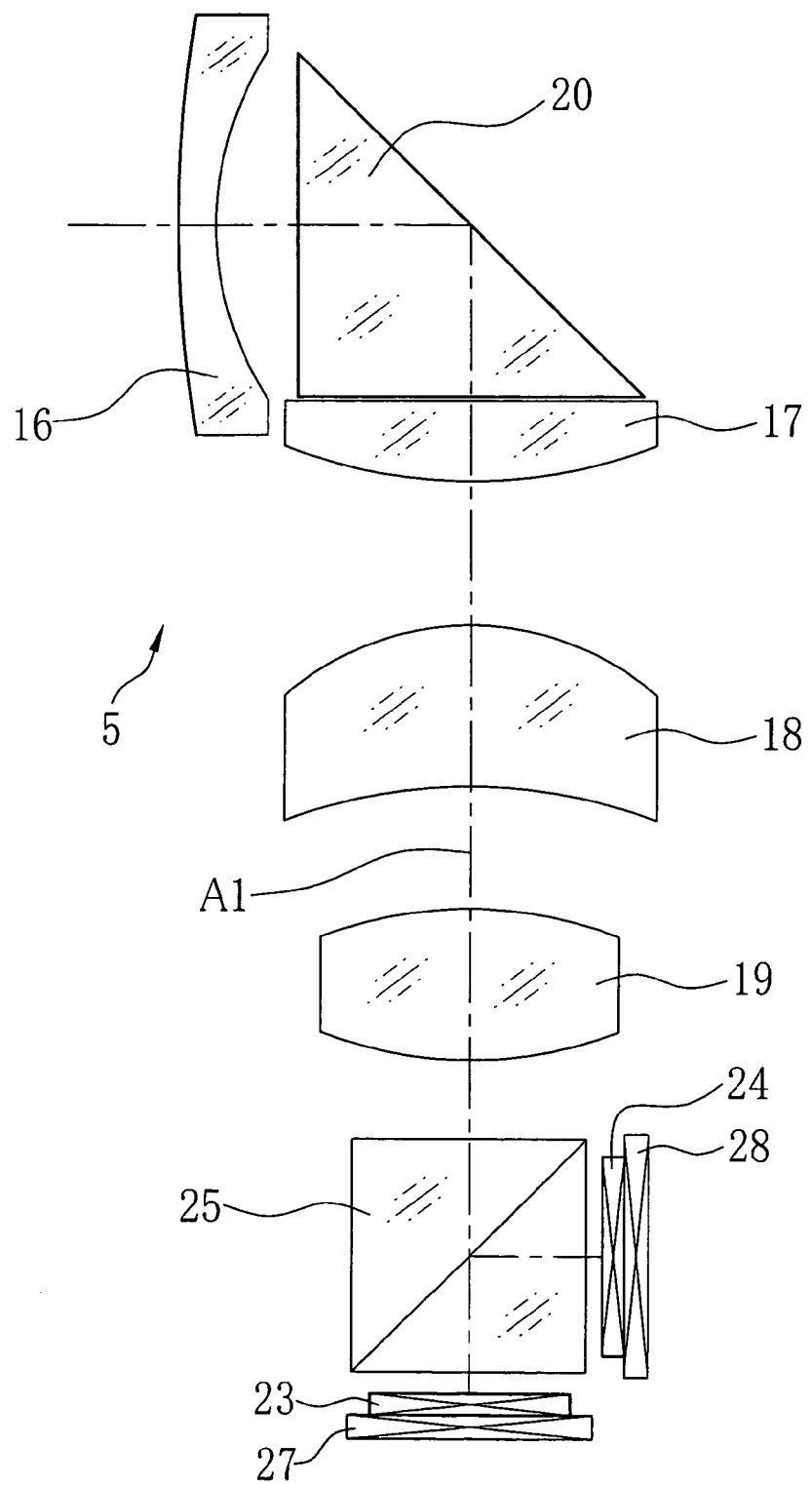
FIG. 3 is a block diagram of a lens unit.

In FIG. 1, a digital still camera 2 is provided with a thin camera body 4 of a rectangular parallelepiped shape and a taking lens 3 part of which is arranged on the front surface thereof. The taking lens 3 is a zooming lens having plural lenses, and is provided in a lens unit 5. An operating dial 8 and a taking button 9 are provided on a top surface of the digital still camera 2. The operating dial 8 is rotated into four positions to select a power-off mode, a capturing mode, a reproducing mode, or a setting mode.

When the operating dial 8 is rotated from the power-off mode position to another position corresponding to one of the above modes, the digital still camera 2 is turned on. In the capturing mode, a subject image can be captured by operating the taking button 9. In the reproducing mode, the captured image recorded in a memory card 10, which is detachable from the digital still camera 2, can be reproduced. In the setting mode, it is possible to change capturing resolution, to switch on or off an automatic flash emitting function, to adjust white balance and so on.

In FIG. 2, a liquid crystal display panel (LCD panel) 11 is provided on a rear surface of the digital still camera 2. The LCD panel 11 functions as an electronic view finder in the capturing mode, and a live-view image being captured is continuously displayed thereon. In the reproducing mode, the image, which is read out from the memory card 10, is displayed on the LCD panel 11. Zoom buttons 12 are located on the upper right side of the LCD panel 11. The zoom buttons 12 are constituted of a zoom-in button and a zoom-out button, to change a zoom magnification of the taking lens 3. Cursor buttons 13 provided below the zoom buttons 12 are mainly used in the setting mode, to change the various settings.

In FIG. 3, a first lens 16, a second lens 17, a third lens 18, and a fourth lens 19, which constitute the taking lens 3, are provided in the lens unit 5. A rectangular prism 20 is provided between the first lens 16 and the second lens 17. An optical axis A1 of the taking lens 3 is bent at a right angle between the first lens 16 and the second lens 17 by the rectangular prism 20. The second lens 17 is fixed close to the rectangular prism 20. The third lens 18 and the fourth lens 19 are moved along the optical axis A1 in zooming to change the capturing magnification. In addition, the fourth lens 19 is moved in focusing as well.

In the lens unit 5, there are a CCD image sensor 23 for capturing green light (G light), and a CCD image sensor 24 for capturing a mixture of red light (R light) and blue light (Blight). A color-separation prism 25 is provided at a position where the normal lines of the CCD image sensors 23, 24 cross. The color-separation prism 25 is formed into a rectangular parallelepiped shape by combining two rectangular prisms. A color separation layer, which transmits the G light, and reflects the R light and the B light, is provided on a contact surface of the two rectangular prisms. The subject light entered into the taking lens 3 is separated to the G light and M light (magenta light), which is the mixture of the R light and the B light, by the rectangular prism 25. The G light enters into the CCD image sensor 23, while the M light enters into the CCD image sensor 24.

The CCD image sensors 23, 24 are respectively provided with sensor moving mechanisms 27, 28. When the subject image is shifted due to camera shake, the sensor moving mechanisms 27, 28 move the CCD image sensors 23, 24 in a plane perpendicular to the optical axis A1, thereby preventing a deviation of the subject image on the image sensors 23, 24.

Figure 4:
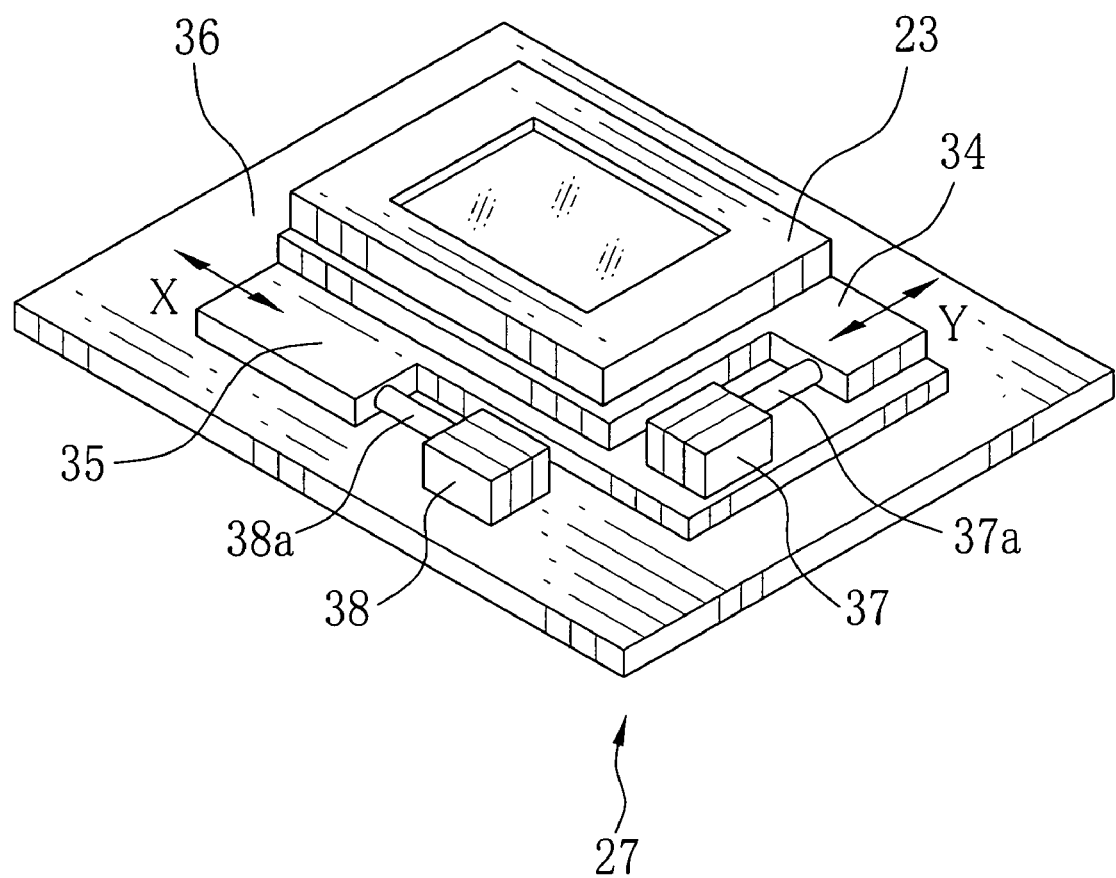
FIG. 4 is a perspective view of a sensor moving mechanism.

In FIG. 4, the sensor moving mechanism 27 is provided with a first supporting plate 34 for supporting the CCD image sensor 23, a second supporting plate 35 for supporting the first supporting plate 34, and a supporting board 36 for supporting the second supporting plate 35. Actuators 37, 38 are respectively provided on front surfaces of the second supporting plate 35 and supporting board 36. A drive rod 37a of the actuator 37 is connected to the first supporting plate 34. A drive rod 38a of the actuator 38 is connected to the second supporting plate 35. Note that a structure of the sensor moving mechanism 28 is the same as that of the sensor moving mechanism 27. Piezoelectric elements can be used as the actuators 37, 38.

The actuators 37, 38 are expanded or compressed depending on voltage direction of driving pulse being applied, to extend or retract the drive rods 37a, 38a along the axial direction thereof. The drive rod 37a is parallel to a vertical direction (Y direction) of the CCD image sensor 23, and the actuator 37 moves the first supporting plate 34 to the Y direction with the CCD image sensor 23. Meanwhile, the drive rod 38a is parallel to a horizontal direction (X direction) of the CCD image sensor 23, and the actuator 38 moves the second supporting plate 35 to the x direction integrally with the CCD image sensor 23 and the first supporting plate 34. For this configuration, the CCD image sensor 23 can be displaced in the Y direction by the actuator 37, and in the X direction by the actuator 38.

Figure 5:
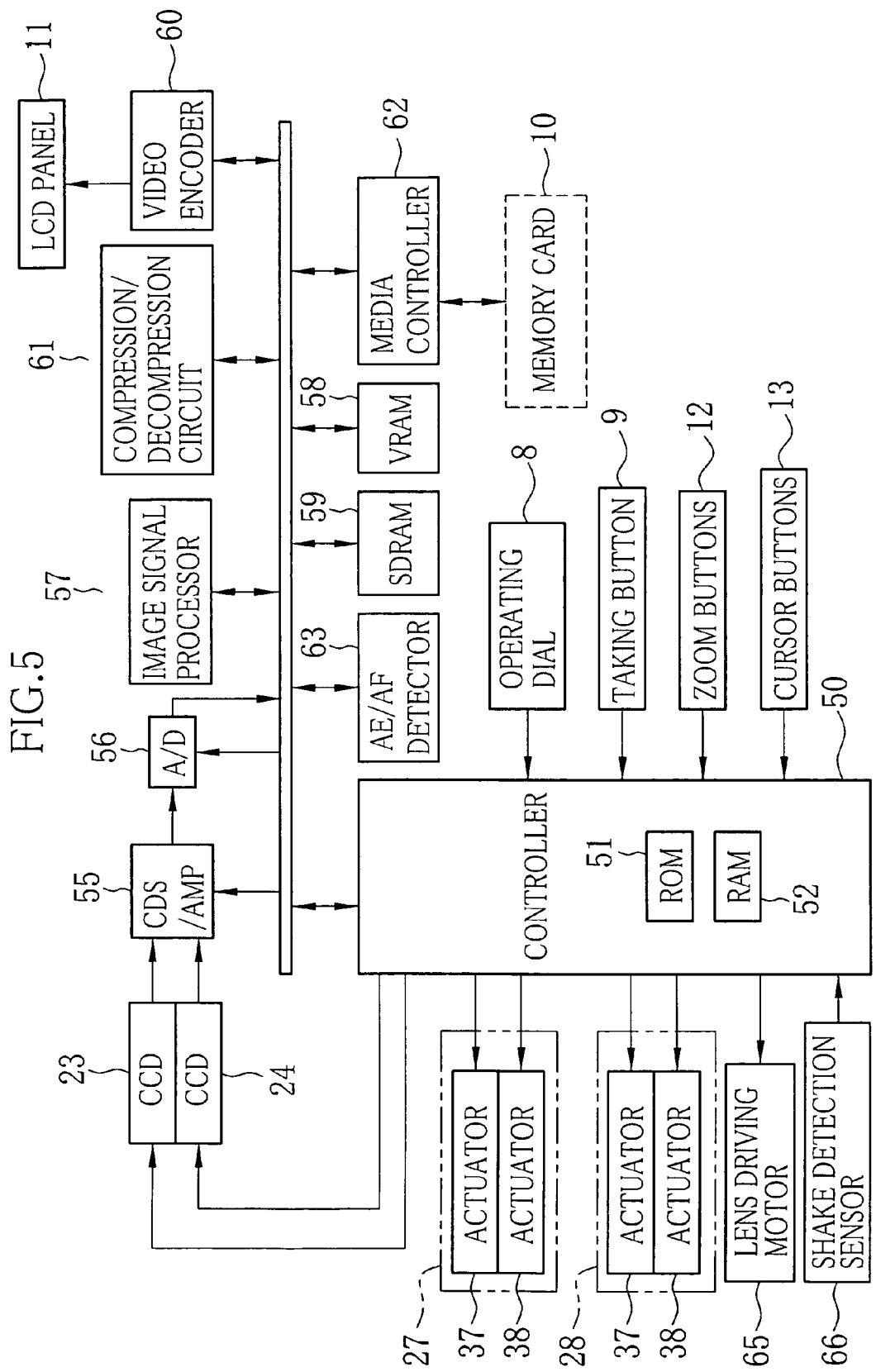
FIG. 5 is a block diagram of an electrical construction of the digital still camera.

In FIG. 5, a controller 50 is provided with a CPU that runs a sequence program stored in a ROM 51, and controls each section of the digital still camera 2 based on the operations of the operating dial 8, the taking button 9, and the zoom buttons 12. A RAM 52 is a work memory used when the controller 50 runs the sequence program.

A CDS/AMP circuit 55 is constituted of correlation double sampling circuit (CDS) and an amplifier (AMP). The CDS generates image signals of R, G and B from the image signals output from the CCD image sensors 23, 24. The AMP amplifies the image signals of R, G and B generated by the CDS. An A/D converter 56 digitizes analog image signals output from the CDS/AMP circuit 55. The digitized image signals are input into an image signal processor 57.

The image signal processor 57 applies the image processing and the YC conversion to the digitized image signals. The image processing includes gradation conversion, white-balance correction, γ-correction and the like. In the capturing mode, before the taking button 9 is pressed, the image signal processor 37 performs the image processing and the YC conversion in a rough manner to the image signals, and writes them as image data temporarily in a VRAM 58. When the taking button 9 is pressed fully to capture a still image, the obtained image signals are written as captured image data in an SDRAM 59 after going through the image processing and the Y/C conversion in high precision in the image signal processor 57. A video encoder 60 converts the image data as written in the VRAM 58 or the SDRAM 59 into composite signals for displaying the live-view image or the recorded image on the LCD panel 11.

A compression/decompression circuit 61 compresses the captured image data written on the SDRAM 59 into a predetermined compression format, e.g. JPEG format, to generate an image file. The compressed image file is written in the memory card 10, or a storage medium, through a media controller 62. The compression/decompression circuit 61 also decompresses the compressed image file read out from the memory card 10, in the reproducing mode.

An AE/AF detector 63 executes an automatic exposure (AE) control process and an automatic focus (AF) detection process. In the AE control process, the AE/AF detector 63 calculates subject brightness from brightness information of the image signal in each pixel as obtained through the CCD image sensor 23 and/or the CCD image sensor 24, and decides photoelectric conversion time of the CCD image sensors 23, 24. In the AF detection process, the AE/AF detector 63 determines an in-focus position of the fourth lens 19 based on the contrast of the image. The AE control process also includes a process for deciding whether to project a flash light from the flash emitter 6 or not.

A driving amount of the actuators 37, 38 and a lens driving motor 65 are controlled by the controller 50. The lens driving motor 65 is driven to move the third lens 18 and the fourth lens 19 to a position corresponding to the zoom magnification when the operation of the zoom buttons 12 is detected by the controller 50. When the taking button 9 is depressed halfway in the capturing mode, the lens driving motor 65 is driven to move the fourth lens 19 within a range, in which the zoom magnification is changed little, to perform focus adjustment.

A shake detection sensor 66 detects the shake from outside, and inputs a shake detection signal representing direction and magnitude of the detected shake into the controller 50. The controller 50 drives the actuators 37, 38 in accordance with the shake detection signal. Accordingly, the CCD image sensors 23, 24 are moved in the plane perpendicular to the optical axis A1 based on the direction and magnitude of the detected shake, to correct the positional deviation of the subject image on each imaging surface.

Figure 6:
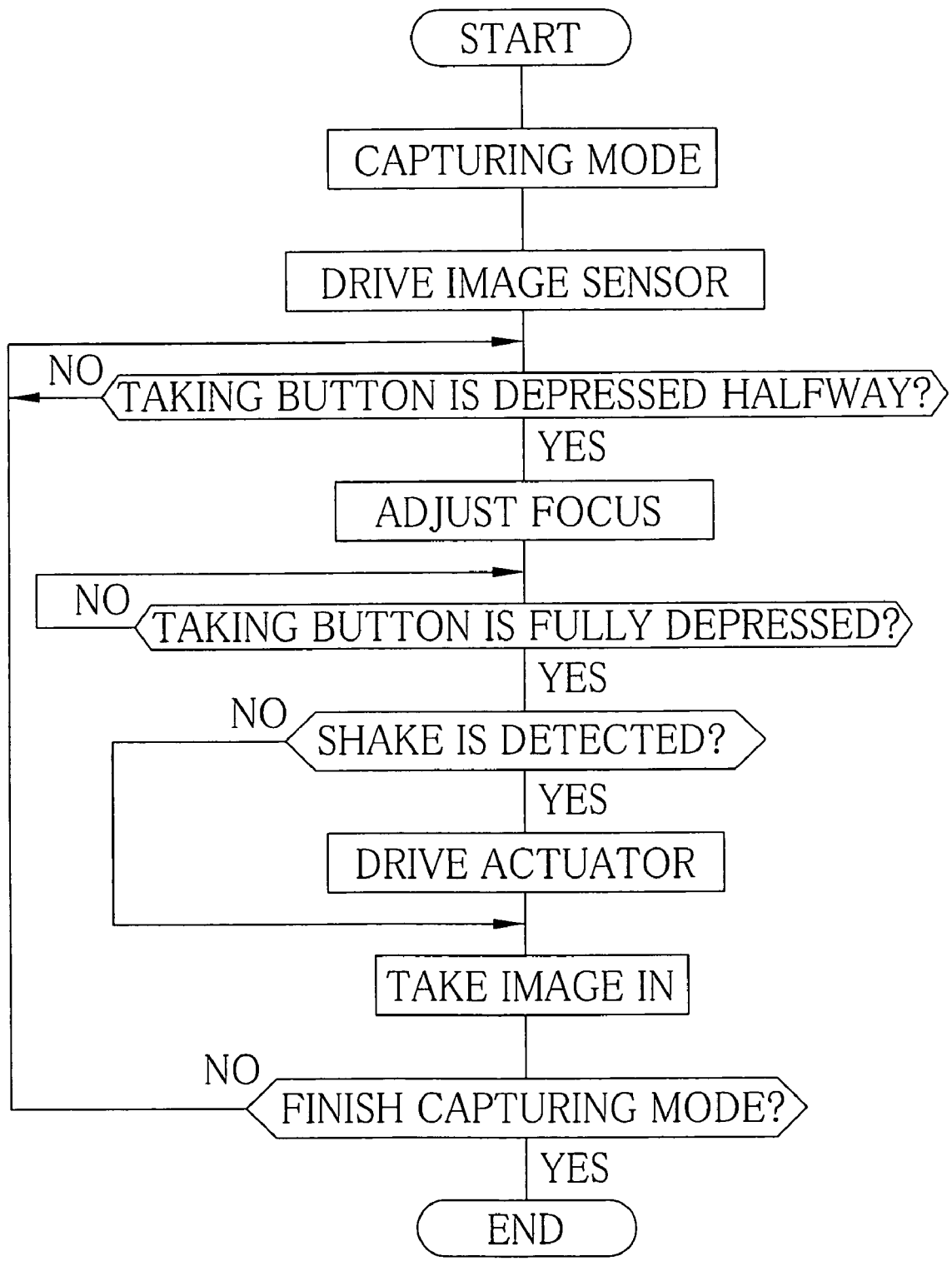
FIG. 6 is a flow chart showing processing procedure of a controller in a capturing mode.

Next, the operation of the digital still camera 2 is explained. In FIG. 6, the digital still camera 2 is turned on as the operating dial 8 of the digital still camera 2 is rotated to set the capturing mode. The controller 50 drives the CCD image sensors 23, 24. The CCD image sensor 23, 24 capture the subject light entered into the taking lens 3 and output the image signals. The live-view image of the subject is displayed on the LCD panel 11. The controller 50 stands by for the capturing operation after completing startup process of the capturing mode.

When the taking button 9 is depressed halfway, the controller 50 decides the exposure amount of the image sensors 23, 24 based on the subject brightness obtained by the AE/AF detector 63. The controller 50 also drives the lens driving motor 65, and decides the position of the fourth lens 19 at which the best contrast is obtained, based on the contrast of the subject image, which is changed by moving the fourth lens 19. In this way, the controller 50 performs the focus adjustment.

When the taking button 9 is fully depressed after the focus adjustment, the controller 50 receives the shake detection signal from the shake detection sensor 66 to judge whether a considerable shake (camera shake) due to hand shake or the like has occurred or not. When the controller 50 judges that the camera shake has not occurred, it captures the subject with the image sensors 23, 24, and takes the image data obtained by the captured image into SDRAM 59. The image data taken into the SDRAM 59 is sent to the compression/decompression circuit 61 to be compressed, and is written in the memory card 13 through the media controller 62.

When the camera shake occurs while the taking button 9 is being fully depressed, the controller 50 calculates a driving direction and driving amount of the actuators 37, 38 based on the direction and magnitude of the shake represented by the shake detection signal. The controller 50 sends the driving pulse based on the calculated driving direction and driving amount to the actuators 37, 38. The actuators 37, 38 are driven to move the first supporting plate 34 in the Y direction, and the second supporting plate 35 in the X direction, respectively. Since the CCD image sensors 23, 24 are respectively moved by the sensor moving mechanisms 27, 28 in the plane perpendicular to the optical axis A1 based on the direction and magnitude of the detected shake, the shift of the subject image on each imaging surface of the CCD image sensors 23, 24 is corrected. After compensating for the camera shake, the controller 50 takes the image data of the subject into the SDRAM 59 in the same manner as described above, and sends it to the compression/decompression circuit 61 to be compressed. The compressed image data is then written in the memory card 10.

In order to finish the capturing mode, the operating dial 8 is rotated to the position of the power-off mode. The controller 50 then starts end process of the capturing mode, and stops the driving of the CCD image sensors 23, 24, and turns off the LCD panel 11.

In the above embodiment, the sensor moving mechanisms 27, 28 linearly move the CCD image sensors 23, 24 in the two directions orthogonal to each other in the same plane. However, the CCD image sensors 23, 24 may be moved in a plane perpendicular to the optical axis A1 by combination of the linear displacement and displacement in a circular direction. In addition, instead of the CCD image sensor, other image sensors such as a CMOS type may be used. Moreover, the present invention may be applied to a video camera and the like in addition to the digital still camera.

In the above embodiment, the digital camera is explained as the imaging apparatus. However, the present invention may be applied to other imaging apparatuses, such as a cell-phone with camera.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging apparatus, comprising:
   a first image sensor and a second image sensor for capturing subject light, which has transmitted through a taking optical system;
   a color-separation optical system for separating said subject light into its component colors each of which enters into a corresponding said first image sensor and second image sensor; and
   plural sensor moving devices each of which moves a corresponding said first image sensor and a second image sensor in a plane perpendicular to an optical axis of said taking optical system,
   wherein each of said plural sensor moving devices comprises a first supporting plate for supporting a corresponding said first image sensor and second image sensor, a second supporting plate for supporting said first supporting plate movably in a first direction, and a supporting board for supporting said second supporting plate movably in a second direction, said first actuator being provided on a front surface of said second supporting plate, whereas said second actuator being provided on a front surface of said supporting board, said first supporting plate being connected with a drive rod of said first actuator, whereas said second supporting plate being connected with a drive rod of said second actuator.

2. The imaging apparatus claimed in claim 1, further comprising:
   a shake detector for detecting direction and magnitude of a shake from outside; and
   a shake corrector for calculating a driving direction and driving amount of each of said plural sensor moving devices based on the detected direction and magnitude of said shake to correct a positional deviation of a subject image on an imaging surface of each of said first image sensor and second image sensor, and for driving each of said plural sensor moving devices according to the calculated driving direction and driving amount.

3. The imaging apparatus claimed in claim 2, wherein each of said plural sensor moving devices comprises first and second actuators for moving a corresponding said first image sensor and said second image sensor in two directions orthogonal to each other in said plane perpendicular to the optical axis.

4. The imaging apparatus claimed in claim 1, wherein said color-separation optical system is a color-separation prism of a rectangular parallelepiped shape formed by a combination of two rectangular prisms, said color-separation optical system being provided in a position where perpendicular lines from surfaces of each of said first image sensor and second image sensor cross.

5. An imaging apparatus claimed in claim 1, wherein, the second supporting plate is provided on the front surface of the supporting board and the first supporting board is provided on the front surface of the second supporting plate and a corresponding first or second image sensor is provided on the front surface of the first supporting plate.

* * * * *